(12) United States Patent
Deng et al.

(10) Patent No.: US 11,748,286 B2
(45) Date of Patent: Sep. 5, 2023

(54) HOT-PLUGGING CONTROL METHOD, DEVICE AND RETIMER

(71) Applicant: Montage Electronics (Shanghai) Co., Ltd., Shanghai (CN)

(72) Inventors: Shuyong Deng, Shanghai (CN); Zeqiang Fu, Shanghai (CN); Hankang Li, Shanghai (CN); Yuxiang Liao, Shanghai (CN); Xin Liu, Shanghai (CN); Yu Fu, Shanghai (CN)

(73) Assignee: Montage Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/564,146

(22) Filed: Dec. 28, 2021

(65) Prior Publication Data
US 2022/0334993 A1    Oct. 20, 2022

(30) Foreign Application Priority Data

Apr. 15, 2021 (CN) .......................... 202110407429.2

(51) Int. Cl.
*G06F 13/40* (2006.01)
*G06F 13/42* (2006.01)

(52) U.S. Cl.
CPC ...... *G06F 13/4004* (2013.01); *G06F 13/4221* (2013.01); *G06F 2213/0026* (2013.01); *G06F 2213/40* (2013.01)

(58) Field of Classification Search
CPC .......................... G06F 13/4004; G06F 13/4221
USPC ......................................................... 710/304
See application file for complete search history.

(56) References Cited

U.S. PATENT DOCUMENTS

| 7,539,808 | B2* | 5/2009 | Kojima | G06F 1/266 713/324 |
| 10,346,340 | B1* | 7/2019 | Tseng | G06F 13/4081 |
| 10,509,758 | B1* | 12/2019 | Habusha | G06F 13/4022 |
| 10,705,594 | B2* | 7/2020 | Srivastava | G06F 1/3253 |
| 2008/0040526 | A1* | 2/2008 | Suzuki | G06F 13/4081 710/302 |
| 2012/0317446 | A1* | 12/2012 | Jaramillo | G06F 11/221 714/43 |
| 2014/0149609 | A1* | 5/2014 | Chan | G06F 13/385 710/16 |
| 2014/0289444 | A1* | 9/2014 | Kuramoto | G06F 13/4022 710/316 |
| 2017/0286360 | A1* | 10/2017 | Srivastava | G06F 13/4295 |
| 2018/0121383 | A1* | 5/2018 | Peng | G06F 13/24 |

(Continued)

*Primary Examiner* — Paul R. Myers

(57) ABSTRACT

The present disclosure provides a hot-plugging control method, device, and retimer. The hot-plugging control method includes: receiving data from a pluggable device through a second end, sending the data to an RC through a first end; sending a detection signal to the second end to detect the connection status between the pluggable device and the second end; and stopping sending the data to the RC, and sending the first control signal to the RC, when it is detected that the pluggable device is hot-unplugged from the second end, so that the RC handles the abnormal state of the data not being sent according to the first control signal. The hot-plugging control method provided by the present disclosure does not require presence signals to implement hot-plugging of a pluggable device, and thus can avoid the problem that the device cannot implement hot-plugging without presence signals.

10 Claims, 2 Drawing Sheets

(56) References Cited

U.S. PATENT DOCUMENTS

2019/0042281 A1\* 2/2019 Raghav ................ G06F 13/102
2019/0227922 A1\* 7/2019 Braun ................... G06F 3/0607

\* cited by examiner

HOT-PLUGGING CONTROL METHOD, DEVICE AND RETIMER

CROSS REFERENCE TO RELATED APPLICATION

The present application claims the benefit of priority to Chinese Patent Application No. CN 2021104074292, entitled "HOT-PLUGGING CONTROL METHOD, DEVICE, RETIMER, EXPANSION CARD, AND ELECTRONIC DEVICE", filed with CNIPA on Apr. 15, 2021, the disclosure of which is incorporated herein by reference in its entirety.

FIELD OF TECHNOLOGY

The present disclosure generally relates to a control method, in particular to a hot-plugging control method, device and retimer.

BACKGROUND

With the continuous development of technology, more and more server manufacturers use retimers to provide users with scalable interconnection solutions for high-performance Peripheral Component Interconnect express (PCIe). Devices such as Non-Volatile Memory express (NVME) Solid State Disk (SSD), Graphics Processing Unit (GPU) box and other devices require hot-plugging capacity while operating a retimer. But in practice, related technologies mainly use presence signals to implement hot-plugging. Thus if the system is designed without presence signals (presence signals indicate whether an external device is plugged-in), it may make the device unable to implement hot-plugging, in which case the device will need to be restarted, reducing the usability of the device.

SUMMARY

The present disclosure provides a hot-plugging control method, device, retimer, expansion card and electronic equipment. The hot-plugging control method includes: receiving data from a pluggable device through a second end; sending the data to a Root Complex (RC) through a first end, wherein the RC supports hot-plugging; sending a detection signal to the second end to detect the connection status between the pluggable device and the second end; and stopping sending the data to the RC, and sending the first control signal to the RC, when it is detected that the pluggable device is hot-unplugged from the second end, so that the RC handles the abnormal state of the data not being sent according to the first control signal. The hot-plugging control method provided by the present disclosure does not require presence signals to implement hot-plugging of a pluggable device, and thus can avoid the problem that the device cannot implement hot-plugging without presence signals.

DETAILED DESCRIPTION

One or more specific embodiments of the present disclosure will be described below. These described embodiments are only examples of the presently disclosed techniques, and are not intended to limit aspects of the presently disclosed invention. Additionally, in an effort to provide a concise description of these embodiments, all features of an actual implementation may not be described in the specification. It should be appreciated that in the development of any such actual implementation, numerous implementation-specific decisions must be made to achieve the developers' specific goals, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In addition, herein, terms such as "first", "second", etc. are only used to distinguish one entity or operation from another entity or operation, and do not necessarily require these entities or operations be in a certain order.

When a retimer is used in a PCIe system, related technology mainly uses presence signals to realize hot-plugging of the device. If presence signals are not considered when the system was designed, or the presence signals are unreliable, or there is a delay in the detection of presence signals, the presence signals may be unusable, which will make the device unable to implement hot-plugging, and the device will need to be restarted, reducing the usability of the device. In light of this problem, an embodiment of the present disclosure provides a hot-plugging control method. The method utilizes a detection signal to obtain the connection status between the pluggable device and an second end, and based on the detected connection status, controls a Root Complex (RC), so as to avoid the abnormality of the RC during hot-plugging processes, and then realizes the hot-plugging of the pluggable device. Compared with prior art, the hot-plugging control method herein does not require presence signals to realize hot-plugging of a pluggable device.

Figure 1A:
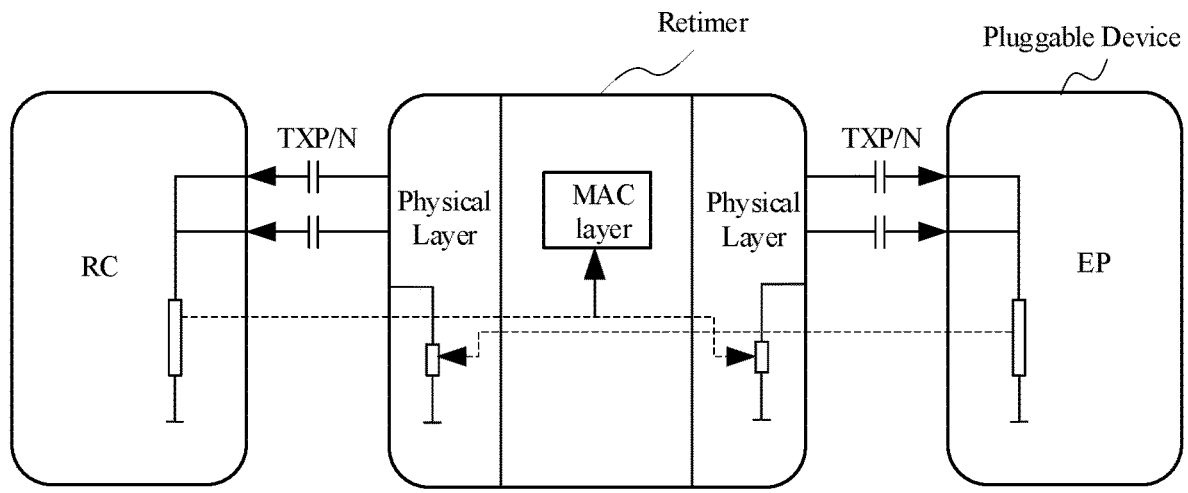
FIG. 1A shows a schematic diagram of the connection relationship between devices involved in a hot-plugging control method according to an embodiment of the present disclosure.

In an embodiment of the present disclosure, referring to FIG. 1A, the hot-plugging control method is applied to a retimer. A first end of the retimer is connected to the RC, and a second end of the retimer is connected to the pluggable device. The pluggable device may be, for example, NVME SSD, GPU BOX, etc.; it should be noted that the second end of the retimer is connected to a pluggable device, the second end of the retimer can be directly connected to the pluggable device, and the second end of the retimer may be provided with a slot; or, in some embodiments, the second end of the retimer may be indirectly connected to the pluggable device through a connecting device. The connecting device is, for example, a connector or socket provided with a slot, etc.

Figure 1B:
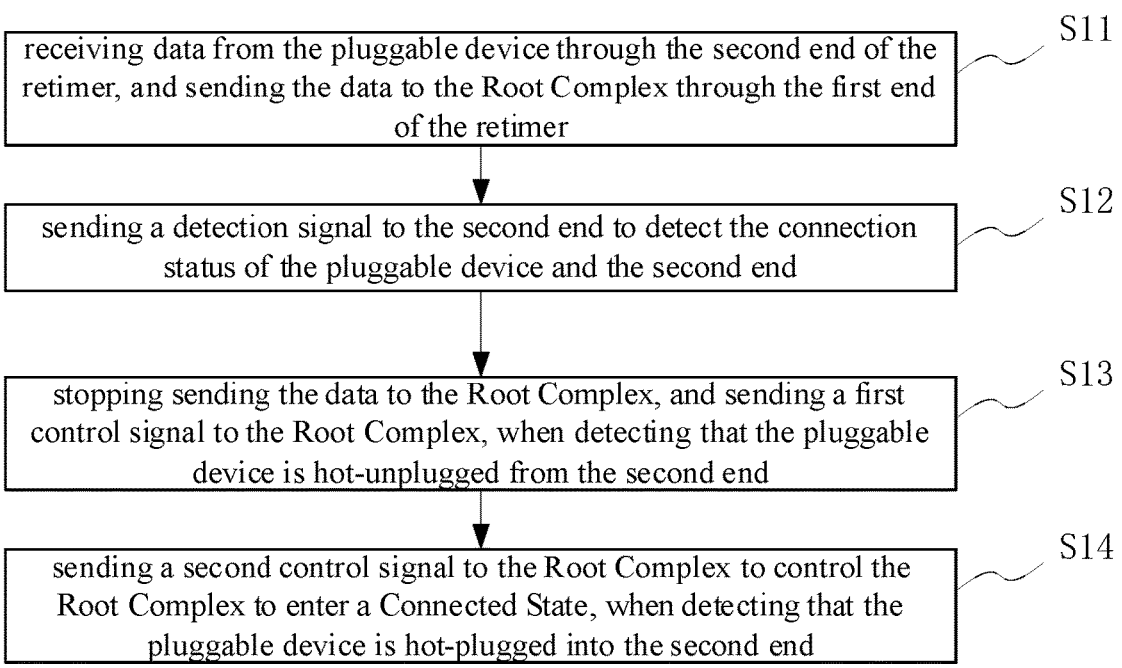
FIG. 1B shows a flowchart of a hot-plugging control method according to an embodiment of the present disclosure.

Specifically, referring to FIG. 1B, the hot-plugging control method according to an embodiment includes:

S11: receiving data from the pluggable device through the second end of the retimer, and sending the data to the RC through the first end of the retimer, wherein the RC supports hot-plugging.

S12: sending a detection signal to the second end to detect the connection status between the pluggable device and the second end.

Optionally, step S12 may include periodically sending the detection signal to the second end, so as to periodically detect the connection status between the pluggable device and the second end.

Optionally, the detection of the connection state between the pluggable device and the second end in step S12 can be implemented using a PCIe Link Training and Status State Machine (LTSSM), where the first state of LTSSM is the Detect State, and in the first state, a termination detect task is performed to confirm the number of data lanes on the opposite end that include resistors. This process can be implemented, for example, by comparing the values of the RC's time constants. By the Detect State, step S12 can obtain the connection status between the pluggable device and the second end.

S13: stopping sending the data to the RC, and sending a first control signal to the RC, when it is detected that the pluggable device is hot-unplugged from the second end, so that the RC, according to the first control signal, can handle the abnormal state of the retimer not sending the data.

Optionally, the first control signal is a special sequence that is different from normal transmission data.

Optionally, the hot-plugging control method described in this embodiment further includes:

S14: sending a second control signal to the RC to control the RC to enter a Connected State, when it is detected that the pluggable device is hot-plugged into the second end. Specifically, when the pluggable device is hot-plugged into the second end, the level value of the detection signal will change; for example, the level value of the detection signal will decrease. At step S14, based on the change of the detection signal, the second control signal is sent to the RC by controlling the internal logic of the retimer to force the RC to enter the Connected State, which is the normal state.

According to the above description, the hot-plugging control method of this embodiment can realize hot-plugging of a pluggable device without presence signals, and thus can avoid the problem that the device cannot realize hot-plugging without presence signals.

In addition, the data transmitted between the retimer and the RC is controlled by the connection status between the pluggable device and the second end: when it is detected that the pluggable device is hot-unplugged from the second end, the data is no longer sent to the RC, and instead a first control signal is sent to the RC; when it is detected that the pluggable device is hot-plugged into the second end, a second control signal is sent to the RC.

Further, the hot-plugging control method in this embodiment can obtain the connection status between the pluggable device and the second end through the PCIe LTSSM. In this case, the hot-plugging control method uses detection results of a detection circuit in the retimer to control a transmission sequence of the data lanes, so that a stable and reliable hot-plugging solution can be realized through data lanes and PCIe in-band signals.

In an embodiment of the present disclosure, when it is detected that the pluggable device is hot-unplugged from the second end, the retimer and the RC remain connected, and the RC is in a Disconnected State.

In an embodiment of the present disclosure, the retimer generates the first control signal when detecting that the pluggable device is hot-unplugged from the second end. Thereafter, the first control signal is sent to the RC at step S13.

Figure 2:
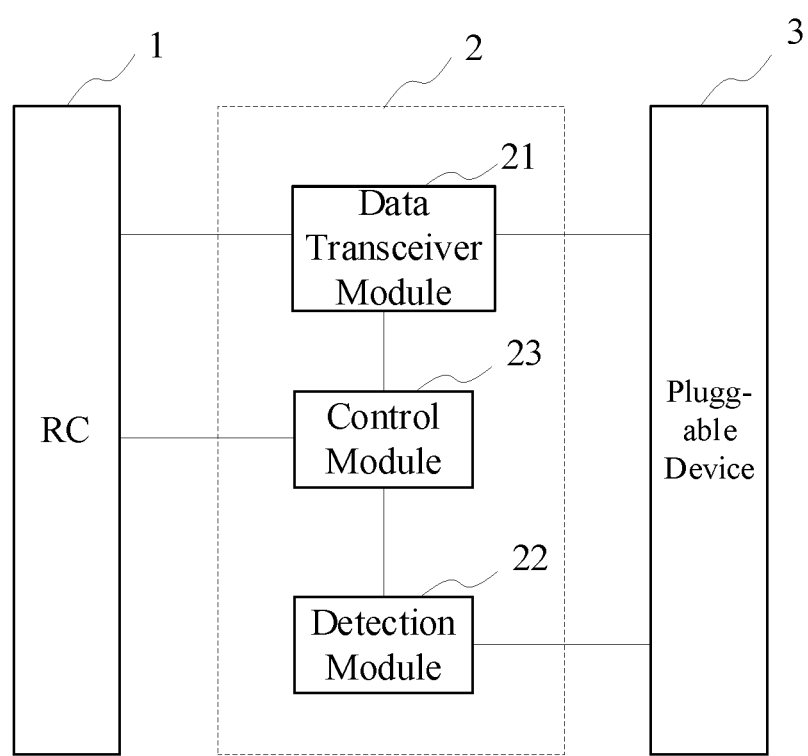
FIG. 2 is a structural diagram of a hot-plugging control device according to an embodiment of the present disclosure.

The present disclosure further provides a hot-plugging control device. Referring to FIG. 2, in an embodiment of the present disclosure, the hot-plugging control device 2 is applied to a retimer, a first end of the retimer is connected to a Root Complex (RC) 1, and a second end of the retimer is connected to a pluggable device 3. The pluggable device 3 may be one of NVME SSD, GPU BOX, etc. It should be noted that the second end is connected to the pluggable device 3, which means that the second end can be directly connected to the pluggable device 3, in which case the second end may be provided with a slot; or, the second end can be indirectly connected with the pluggable device 3 through a connecting device, and the connecting device is, for example, a connector or socket provided with a slot. In this embodiment, the hot-plugging control device 2 includes a data transceiver module 21, a detection module 22, and a control module 23.

The data transceiver module 21 is connected to the RC 1 and the pluggable device 3, receives data from the pluggable device 3 through the second end of the retimer, and sends the data, through the first end of the retimer, to the RC 1. The RC 1 supports hot-plugging.

The detection module 22 is connected to the pluggable device 3 and the control module 23, and sends a detection signal to the second end to detect the connection status between the pluggable device 3 and the second end.

Optionally, the detection module 22 periodically sends the detection signal to the second end, so as to periodically detect the connection status between the pluggable device 3 and the second end.

Optionally, the detection module 22 may use PCIe Link Training and Status State Machine to detect the connection status. The first state of Link Training and Status State Machine is the Detect State. In this state, a termination detection task needs to be completed to confirm the number of data lanes on the opposite end that include resistors. This detection process can be implemented, for example, by comparing the values of the RC's time constants. By the Detect State, the detection module 22 can obtain the connection status between the pluggable device 3 and the second end.

The control module 23 is connected to the data transceiver module 21, the detection module 22, and the RC 1. When the detection module 22 detects that the pluggable device 3 is hot-unplugged from the second end, the control module 23 controls the data transceiver module 21 to stop sending the data to the RC 1, and the control module 23 sends a first control signal to the RC 1, so that the RC 1, according to the first control signal, handles the abnormal state of the retimer not sending the data.

Optionally, the first control command is a special sequence that is different from normal transmission data.

Optionally, in this embodiment, when the detection module 22 detects that the pluggable device 3 is hot-plugged into the second end, the control module 23 further sends a second control signal to the RC 1, to control the RC 1 to enter a Connected state. Specifically, after the pluggable device 3 is hot-plugged into the second end, the level value of the detection signal will change; for example, the level value of the detection signal will decrease. Based on the detection signal, the control module 23 sends the second control signal to the RC 1 by controlling the internal logic of the retimer to force the RC 1 to enter the Connected State, which is the normal state.

In an embodiment of the present disclosure, when the detection module 22 detects that the pluggable device 3 is hot-unplugged from the second end, the retimer and the RC 1 remain connected, and the RC 1 is in a Disconnected State.

In an embodiment of the present disclosure, the retimer generates the first control signal when detecting that the pluggable device is hot-unplugged from the second end. Thereafter, the control module 23 sends the first control signal to the RC 1.

Based on the above description of the hot-plugging control method, the present disclosure further provides a retimer, which performs hot-plugging control using the hot-plugging control method shown in FIG. 1B.

Based on the above description of the hot-plugging control method, the present disclosure further provides an expansion card. The expansion card includes gold fingers and a retimer. Specifically, the gold fingers are disposed at one end of the expansion card, and the gold fingers transmit a PCIe signal, a clock reset signal and an Inter-Integrated Circuit (I2C) signal of the motherboard to the retimer. One end of the retimer is connected to the gold fingers, the other end of the retimer can be connected a device that requires hot-plugging, and the retimer performs hot-plugging control using the hot-plugging control method shown in FIG. 1B. It should be noted that the other end of the retimer can be connected to the device that requires hot-plugging, which means that the other end of the retimer can be directly connected to the device that requires hot-plugging, in which case the other end of the retimer may be provided with, for example, a slot; or, the other end of the retimer can be indirectly connected with the device that requires hot-plugging through a connecting device, and the connecting device is, for example, a connector or socket provided with a slot.

Based on the above description of the hot-plugging control method, the present disclosure further provides an electronic device including an RC and a retimer. A first end of the retimer is connected to the RC, a second end of the retimer is connected to a pluggable device, and the retimer performs hot-plugging control using the hot-plugging control method shown in FIG. 1B. It should be noted that the second end of the retimer is connected to the pluggable device, which means that the second end of the retimer can be directly connected to the pluggable device, and the second end may be provided with a slot; or, the second end can be indirectly connected with the pluggable device through a connecting device, and the connecting device is, for example, a connector or socket provided with a slot.

The execution orders of various steps of the hot-plugging control method enumerated in the present disclosure are only examples of the presently disclosed techniques, and are not intended to limit aspects of the presently disclosed invention. Any omission or replacement of the steps, and extra steps consistent with the principles of the present invention are within the scope of the present disclosure.

The present disclosure further provides a hot-plugging control device, which can implement the hot-plugging control method described in the present disclosure. The devices that can implement the hot-plugging control method described in the present disclosure include but are not limited to the devices with the structure of the hot-plugging control device described herein, and any structural modification and replacement of the prior art made according to the principles of the present disclosure, are included in the scope of the present disclosure.

In the present disclosure, the hot-plugging control method uses detection signals to obtain the connection status between the pluggable device and the second end of the retimer, and implements control of the RC based on the detected connection status, thereby preventing abnormality of the RC during the plugging process, thereby realizing hot-plugging of the pluggable device. Compared with related technologies, the hot-plugging control method does not require presence signals to realize hot-plugging of a pluggable device, and thus can avoid the problem that the device cannot realize hot-plugging without presence signals.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention

What is claimed is:

1. A hot-plugging control method, applied to a retimer, wherein a first end of the retimer is connected to a root complex, a second end of the retimer is connected to a pluggable device, wherein the hot-plugging control method includes:
   receiving, by the retimer, data from the pluggable device through the second end of the retimer, and sending, by the retimer, the data to the Root Complex through the first end of the retimer, wherein the Root Complex supports hot-plugging;
   periodically sending, by the retimer, a detection signal to the second end, and activating a Detect State of a Link Training and Status State Machine of the retimer, to detect the connection status between the pluggable device and the second end; and
   stopping sending the data to the Root Complex, and sending, by the retimer, a first control signal to the Root Complex, when detecting that the pluggable device is hot-unplugged from the second end, so that the Root Complex, according to the first control signal, handles the abnormal state of the data sending being stopped.

2. The hot-plugging control method according to claim 1, further comprising: sending a second control signal to the Root Complex to control the Root Complex to enter a Connected State, when it is detected that the pluggable device is hot-plugged into the second end.

3. The hot-plugging control method according to claim 1, wherein when detecting that the pluggable device is hot-unplugged from the second end, the retimer and the Root Complex remain connected, and the Root Complex is in a Disconnected State.

4. The hot-plugging control method according to claim 1, wherein the retimer generates the first control signal when detecting that the pluggable device is hot-unplugged from the second end.

5. The hot-plugging control method according to claim 1, wherein the connection status between the pluggable device and the second end is detected by monitoring an RC time constant of the retimer and a level value of the detection signal.

6. A hot-plugging control device, applied to a retimer, wherein a first end of the retimer is connected to a Root Complex, a second end of the retimer is connected to a pluggable device, wherein the hot-plugging control device includes:
   a data transceiver module, configured to receive data from the pluggable device through the second end, and send the data to the Root Complex through the first end, wherein the Root Complex supports hot-plugging;
   a detection module, configured to periodically send a detection signal to the second end and to activate a Detect State of a Link Training and Status State Machine of the retimer to detect the connection status between the pluggable device and the second end; and a control module, connected to the data transceiver module and the detection module, wherein when the detection module detects that the pluggable device is hot-unplugged from the second end, the control module controls the data transceiver module to stop sending the data to the Root Complex, and sends a first control signal to the Root Complex, so that the Root Complex, according to the first control signal, handles the abnormal state of the data sending being stopped.

7. The hot-plugging control device according to claim 6, wherein when the detection module detects that the pluggable device is hot-plugged into the second end, the control module sends a second control signal to the Root Complex to control the Root Complex to enter a Connected state.

8. The hot-plugging control device according to claim 6, wherein when the detection module detects that the pluggable device is hot-unplugged from the second end, the retimer and the Root Complex remain connected, and the Root Complex is in a Disconnected State.

9. The hot-plugging control device according to claim 6, wherein the retimer generates the first control signal when detecting that the pluggable device is hot-unplugged from the second end.

10. A retimer, used to perform hot-plugging control using a hot-plugging control method, wherein the hot-plugging control method is applied to a retimer, a first end of the retimer is connected to a root complex, a second end of the retimer is connected to a pluggable device,
wherein the hot-plugging control method comprises:
receiving, by the retimer, data from the pluggable device through the second end, and sending, by the retimer, the data to the Root Complex through the first end, wherein the Root Complex supports hot-plugging;
periodically, sending a detection signal, by the retimer, to the second end, and activating a Detect State of a Link Training and Status State Machine of the retimer, to detect the connection status between the pluggable device and the second end; and
stopping sending the data to the Root Complex, and sending, by the retimer, a first control signal to the Root Complex, when detecting that the pluggable device is hot-unplugged from the second end, so that the Root Complex, according to the first control signal, handles the abnormal state of the data sending being stopped.

* * * * *